No. 716,252. Patented Dec. 16, 1902.
R. D. LAUGHLIN.
ELECTRIC BRUSH.
(Application filed May 10, 1902.)
(No Model.)
Fig. 1.
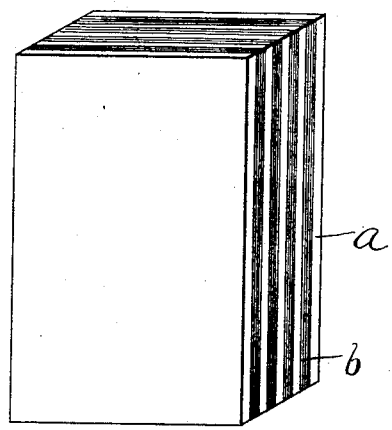
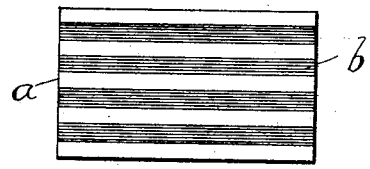
Fig. 2.
Witnesses.
E. B. Gilchrist
H. M. Wise.
Inventor:
Robert D. Laughlin
By his attorneys
Thurston & Bates

UNITED STATES PATENT OFFICE.

ROBERT D. LAUGHLIN, OF RAVENNA, OHIO, ASSIGNOR TO NATIONAL CARBON COMPANY, OF CLEVELAND, OHIO, A CORPORATION OF NEW JERSEY.

ELECTRIC BRUSH.

SPECIFICATION forming part of Letters Patent No. 716,252, dated December 16, 1902.

Application filed May 10, 1902. Serial No. 106,679. (No model.)

*To all whom it may concern:*

Be it known that I, ROBERT D. LAUGHLIN, a citizen of the United States, residing at Ravenna, in the county of Portage and State of Ohio, have invented a certain new and useful Improvement in Electric Brushes, of which the following is a full, clear, and exact description, reference being had to the accompanying drawings.

The invention relates to improvements in brushes for electric generators, motors, controllers, and electrical appliances where electric contact between relatively movable surfaces is required—as, for example, between a fixed brush and a rotating commutator.

The object of the present invention is to provide an electric brush of such construction that it will lubricate the surface of the commutator, and thereby reduce the wear thereof incident to the contact, but which will be an exceedingly good conductor of the electric current.

The brush embodying the invention is a laminated structure composed of alternate layers of plumbago and carbon, the two outer layers being made of carbon, substantially as hereinafter described, and pointed out definitely in the claim.

In the drawings, Figure 1 is a perspective view of an electric brush embodying my invention. Fig. 2 is a top plan view of the same.

As will be seen from the drawings, the brush is a laminated structure. It is composed of alternate layers of carbon $a$ and plumbago or graphite $b$. Any number of layers may be employed; but the two outer layers should be of carbon, and the layers should extend from one end to the other of the brush.

The described brush is an exceedingly good conductor of the current—rather better than a brush made of carbon alone. The graphite will lubricate the commutator-surface, against which the end of the brush is held in contact. Moreover, because of the laminated structure of the brush the Foucault or eddy current will not be developed therein.

In constructing this brush the several layers are separately made, preferably by being forced out of a so-called "Jumbo" press in the form of ribbons and then cut into plates of the required length. These plates are then laid together, substantially as shown, while still green and pressed into intimate contact, after which they are baked or cured by heat in suitable ovens.

Having described my invention, I claim—

A laminated electric brush composed of alternate layers of carbon and plumbago, substantially as and for the purpose specified.

In testimony whereof I hereunto affix my signature in the presence of two witnesses.

ROBERT D. LAUGHLIN.

Witnesses:
F. G. HALSTEAD,
H. L. BEATTY.